(12) United States Patent
Chang et al.

(10) Patent No.: US 8,859,711 B2
(45) Date of Patent: Oct. 14, 2014

(54) METHOD FOR PREPARING WHOLLY AROMATIC LIQUID CRYSTALLINE POLYESTER AMIDE RESIN AND METHOD FOR PREPARING WHOLLY AROMATIC LIQUID CRYSTALLINE POLYESTER AMIDE RESIN COMPOUND

(75) Inventors: Sun Hwa Chang, Daejeon (KR); Sang Mi Kang, Daejeon (KR); Dae Yeon Kim, Gangneung-si (KR)

(73) Assignee: Samsung Fine Chemicals Co., Ltd. (KR)

( * ) Notice: Subject to any disclaimer, the term of this patent is extended or adjusted under 35 U.S.C. 154(b) by 0 days.

(21) Appl. No.: 13/884,723

(22) PCT Filed: Oct. 21, 2011

(86) PCT No.: PCT/KR2011/007867
§ 371 (c)(1),
(2), (4) Date: May 10, 2013

(87) PCT Pub. No.: WO2012/070774
PCT Pub. Date: May 31, 2012

(65) Prior Publication Data
US 2013/0231453 A1    Sep. 5, 2013

(30) Foreign Application Priority Data

Nov. 23, 2010 (KR) .................. 10-2010-0117106

(51) Int. Cl.
| | | |
|---|---|---|
| *C08G 64/00* | (2006.01) | |
| *C09K 19/38* | (2006.01) | |
| *C08L 77/12* | (2006.01) | |
| *C08G 69/44* | (2006.01) | |
| *C08G 63/02* | (2006.01) | |

(52) U.S. Cl.
CPC ............. *C09K 19/3809* (2013.01); *C08L 77/12* (2013.01); *C08G 69/44* (2013.01)
USPC ............................ 528/190; 528/192; 528/193

(58) Field of Classification Search
CPC ...................................................... C08G 63/605
USPC .......................................... 528/190, 192, 193
See application file for complete search history.

(56) References Cited

U.S. PATENT DOCUMENTS

| 5,233,013 A | 8/1993 | Parodi et al. |
| 6,774,203 B1 | 8/2004 | Fukute |
| 2006/0084747 A1 | 4/2006 | Asahara et al. |

FOREIGN PATENT DOCUMENTS

| CN | 1732229 A | 2/2006 |
| CN | 1760232 A | 4/2006 |
| JP | 1990058537 A | 2/1990 |
| JP | 1992353519 A | 12/1992 |
| JP | 2005298772 A | 10/2005 |
| KR | 1020100080085 A | 7/2010 |
| WO | 9734964 A1 | 9/1997 |
| WO | 2004094502 A1 | 11/2004 |

OTHER PUBLICATIONS

Written Opinion for International Application No. PCT/KR2011/007867 dated May 22, 2012.
International Search Report with English Translation for International Application No. PCT/KR2011/007867 dated May 22, 2012.
European Search Report dated Apr. 16, 2014, for the European Patent Application No. 11843641.9.
CN Office Action for Application No. 201180056088.3, dated May 13, 2014.

*Primary Examiner* — Terressa Boykin
(74) *Attorney, Agent, or Firm* — Cantor Colburn LLP

(57) ABSTRACT

A method of preparing a wholly aromatic liquid crystalline polyester amide resin and a method of preparing a wholly aromatic liquid crystalline polyester amide resin compound. The method of preparing a wholly aromatic liquid crystalline polyester amide resin is performed using a monomer having both a hydroxyl group and an acetylamino group or using a monomer having a hydroxyl group and a monomer having an acetylamino group. In addition, the method of preparing a wholly aromatic liquid crystalline polyester amide resin compound is performed using a wholly aromatic liquid crystalline polyester amide resin that is prepared using the method.

22 Claims, No Drawings

METHOD FOR PREPARING WHOLLY AROMATIC LIQUID CRYSTALLINE POLYESTER AMIDE RESIN AND METHOD FOR PREPARING WHOLLY AROMATIC LIQUID CRYSTALLINE POLYESTER AMIDE RESIN COMPOUND

TECHNICAL FIELD

The present invention relates to a method of preparing a wholly aromatic liquid crystalline polyester amide resin and a method of preparing a wholly aromatic liquid crystalline polyester amide resin compound, and more particularly, to a method of preparing a wholly aromatic liquid crystalline polyester amide resin by using a monomer having a hydroxyl group and an acetylamino group or using a monomer having a hydroxyl group and another monomer having an acetylamino group and a method of preparing a wholly aromatic liquid crystalline polyester amide resin compound by using a wholly aromatic liquid crystalline polyester amide resin prepared using the same.

BACKGROUND ART

Wholly aromatic liquid crystalline polyester amide resins have rigid molecules, which may be present in a liquid crystalline state without entanglement between molecules even in a molten state, and exhibit the behavior of molecular chains being oriented in a flow direction of the wholly aromatic liquid crystalline polyester amide resin by shear force when being molded. Thus, wholly aromatic liquid crystalline polyester amide resins exhibit the behavior in which the melt viscosity thereof suddenly decreases even though small shear force is applied thereto or the melt viscosity thereof rapidly decreases as the temperature increases.

Due to having these characteristics, wholly aromatic liquid crystalline polyester amide resins have good flowability and resistance to heat, and thus, have been widely used as a material for vehicle parts, electric and electronic parts, and small and precise molded products.

Due to the recent remarkable industrial advances, the uses of wholly aromatic liquid crystalline polyester amide resins tend to become more sophisticated and specialized. In addition, wholly aromatic liquid crystalline polyester amide resins have good fluidity for efficient and economical injection molding. Such wholly aromatic liquid crystalline polyester amide resins are good, more specifically, in heat resistance, resistance to hydrolysis and dimensional stability at a high temperature, and mechanical strength, such as flexural strength, tensile strength, impact strength, and thus, have extended uses as materials for coil bobbins which need to solder at a high temperature, connectors for electric and electronic parts, relay, various vehicle parts, containers, films, and substrates.

Such wholly aromatic liquid crystalline polyester amide resins may be prepared by condensation polymerization between at least two different monomers.

Wholly aromatic liquid crystalline polyester amide resins may be prepared by acetylating a monomer having a hydroxyl group and a monomer having an amino group or acetylating a monomer having both a hydroxyl group and an amino group and then condensation-polymerizing the acetylated monomers with aromatic dicarboxylic acid. In this regard, the monomer having an amino group is necessarily used in the acetylating process.

The condensation polymerization reaction is conducted at a high temperature, and the monomer having an amino group is easy to be pyrolyzed at a high temperature or oxidized by oxygen in air and thus the pyrolysis or oxidation of the amino group needs to be prevented by acetylating the amino group before the condensation polymerization reaction. If the amino group is not completely acetylated in the acetylating of the monomer, however, remaining amino groups are pyrolyzed during the high-temperature condensation polymerization, thereby producing a gaseous byproduct and thus the surface of a reaction product foams, whereby the surface thereof swells. If the surface of the reaction product swells to an upper top of a reactor, a column for exhausting the gaseous byproduct may be clogged, thus not being able to remove the gaseous byproduct any longer. This may deteriorate physical properties of a wholly aromatic liquid crystalline polyester amide prepolymer and wholly aromatic liquid crystalline polyester amide resins, and further cause a processing hindrance, which requires disassembling and cleaning of the reactor. Indeed, when monomers having amino groups and monomers having hydroxyl groups are simultaneously acetylated, 80 to 90% of the amino groups are acetylated. On the other hand, when monomers having amino groups and monomers having hydroxyl groups are separately acetylated, 95 to 97% of the amino groups are acetylated. Since the amino groups are not completely acetylated in any case, problems due to byproducts such as a carbonyl compound (e.g., benzoquinone) may occur. Such problems will be described below.

In addition, if the gaseous byproduct is not removed from the reaction product during the condensation polymerization reaction even though the foaming caused by the gaseous product does not reach the upper top of the reactor, the resulting wholly aromatic liquid crystalline polyester amide resin may not have uniform physical properties. As a result, wholly aromatic liquid crystalline polyester amide resin compounds and molded products manufactured from the wholly aromatic liquid crystalline polyester amide resin may have non-uniform, poor physical properties. In particular, the aromatic polyester resin compound may have reduced mechanical strength, and the molded products may undergo blistering when left in high-temperature air or liquid for a long time.

In addition, when monomers having amino groups are reacted not in an inert gas atmosphere but in air atmosphere, the amino groups are oxidized by oxygen in air, thereby forming carbonyl groups. In other words, the monomers having amino groups are converted to carbonyl compounds (e.g., benzoquinone), which are susceptible to sublimation. Thus, the equilibrium between the equivalents of the monomers is destroyed during the condensation polymerization reaction and, as a result, the reaction is not smoothly performed. In addition, if the carbonyl compound is bound to a terminal portion of the formed resin by the condensation polymerization reaction, the condensation polymerization reaction is not performed on the terminal portion thereof any longer and thus the molecular weight of the formed resin does not further increase. Furthermore, a carbonyl compound such as benzoquinone changes a color of the formed resin into red and rapidly reduces the fluidity of the formed resin.

DISCLOSURE OF INVENTION

Technical Problem

The present invention provides a method of preparing a wholly aromatic liquid crystalline polyester amide resin by using a monomer having both a hydroxyl group and an acetylamino group or using a monomer having a hydroxyl group and a monomer having an acetylamino group.

The present invention also provides a method of preparing a wholly aromatic liquid crystalline polyester amide resin compound by using a wholly aromatic liquid crystalline polyester amide resin that is prepared using the method of preparing a wholly aromatic liquid crystalline polyester amide resin.

Solution to Problem

According to an aspect of the present invention, there is provided a method of preparing a wholly aromatic liquid crystalline polyester amide resin, the method including: acetylating a first monomer having both a hydroxyl group and an acetylamino group and not having an amino group by reacting the first monomer with carboxylic acid anhydride; and synthesizing a wholly aromatic liquid crystalline polyester amide prepolymer by a condensation polymerization reaction of the acetylated first monomer and aromatic dicarboxylic acid.

The method may further include acetylating a second monomer having a hydroxyl group and not having an amino group and an acetylamino group by reacting the second monomer with carboxylic acid anhydride.

The first monomer may include at least one compound selected from the group consisting of para-acetylaminophenol, 3-acetylaminophenol, 2-acetylaminophenol, 3-acetylamino-2-naphthol, 5-acetylamino-1-naphthol, and 8-acetylamino-2-naphthol.

According to another aspect of the present invention, there is provided a method of preparing a wholly aromatic liquid crystalline polyester amide resin, the method including: acetylating a second monomer having a hydroxyl group and not having an amino group and an acetylamino group by reacting the second monomer with carboxylic acid anhydride; and synthesizing a wholly aromatic liquid crystalline polyester amide resin prepolymer by a condensation polymerization reaction of the acetylated second monomer, a third monomer having an acetylamino group and not having a hydroxyl group and an amino group, and aromatic dicarboxylic acid.

The method may further include synthesizing a wholly aromatic liquid crystalline polyester amide resin by a solid-phase condensation polymerization reaction of the synthesized wholly aromatic liquid crystalline polyester amide resin prepolymer.

An amount of the carboxylic acid anhydride may be in a range of 1.0 to 4.0 moles by weight based on 1 mole of a total amount of the hydroxyl groups of the used monomers.

The second monomer may include at least one compound selected from the group consisting of aromatic diols and aromatic hydroxycarboxylic acids.

The aromatic diol may include at least one compound selected from the group consisting of 4,4'-biphenol, hydroquinone, 1,4-dihydroxy naphthalene, and 2,6-dihydroxy naphthalene, and the aromatic hydroxycarboxylic acid comprises at least one compound selected from para-hydroxy benzoic acid and 6-hydroxy-2-naphthoic acid.

The third monomer may include at least one selected from the group consisting of 4-acetylamino benzoic acid, 3-acetylamino benzoic acid, 2-acetylamino benzoic acid, 3-acetylamino-2-naphthoic acid, and 6-acetylamino-2-naphthoic acid.

The carboxylic acid anhydride may include at least one compound selected from the group consisting of acetic anhydride, diphenyl carbonate, and benzyl acetate.

The aromatic dicarboxylic acid may include at least one compound selected from the group consisting of isophthalic acid, terephthalic acid, 1,4-naphthalene dicarboxylic acid, 2,3-naphthalene dicarboxylic acid, and 2,6-naphthalene dicarboxylic acid.

The acetylating of the first monomer or the acetylating of the second monomer may be performed at a temperature of 140 to 160° C. for 1 to 3 hours.

The synthesizing of the wholly aromatic liquid crystalline polyester amide prepolymer may be performed at a temperature of 310 to 340° C. for 5 to 8 hours.

According to another aspect of the present invention, there is provided a method of preparing a wholly aromatic liquid crystalline polyester amide resin compound by using a wholly aromatic liquid crystalline polyester amide resin that is prepared using the method described above.

Advantageous Effects of Invention

According to the one or more embodiments of the present invention, in the methods of preparing a wholly aromatic liquid crystalline polyester amide resin, during a high-temperature condensation polymerization reaction, a less amount of gaseous byproducts may be generated, thus producing few bubbles on the surface of a final product. As a result, clogging of a gaseous byproduct discharge column and incorporation of the byproduct into the final product may unlikely occur, thus preventing physical property deteriorations in resin itself and molded products manufactured therefrom. Accordingly, wholly aromatic liquid crystalline polyester amide resins with uniform physical properties overall, and resin compounds and molded products with improved mechanical strength (in particular, flexural characteristics) and heat-resistance may be prepared. In addition, the reddening of a wholly aromatic liquid crystalline polyester amide resin and a compound thereof by a carbonyl compound such as benzoquinone may be prevented. Furthermore, molded products thereof that do not undergo blistering even under a high-temperature heat-treatment may be prepared.

MODE FOR THE INVENTION

Hereinafter, according to embodiments of the present invention, methods of preparing a wholly aromatic liquid crystalline polyester amide resin and a method of preparing a wholly aromatic liquid crystalline polyester amide resin compound by using a wholly aromatic liquid crystalline polyester amide resin that is prepared using the method will be described in detail.

As used herein, the term "and/or" includes any and all combinations of one or more of the associated listed items. Expressions such as "at least one of," when preceding a list of elements, modify the entire list of elements and do not modify the individual elements of the list.

According to an embodiment of the present invention, a method of preparing a wholly aromatic liquid crystalline polyester amide resin includes acetylating a first monomer having both a hydroxyl group (—OH) and an acetylamino group (—NHCOCH$_3$) and not including an amino group (—NH$_2$), by reacting the first monomer with a carboxylic acid anhydride (first monomer acetylation process) and synthesizing a wholly aromatic liquid crystalline polyester amide prepolymer by condensation polymerizing the acetylated first monomer with aromatic dicarboxylic acid.

The method of preparing a wholly aromatic liquid crystalline polyester amide resin may further include acetylating a second monomer having a hydroxyl group and not including an amino group and an acetylamino group, by reacting the second monomer with a carboxylic acid anhydride (second monomer acetylation process). The first monomer acetylation process and the second monomer acetylation process may be simultaneously or sequentially performed.

According to another embodiment of the present invention, a method of preparing a wholly aromatic liquid crystalline polyester amide resin includes acetylating a second monomer having a hydroxyl group and not including an amino group and an acetylamino group, by reacting the second monomer with a carboxylic acid anhydride (second monomer acetylation process), and synthesizing a wholly aromatic liquid crystalline polyester amide prepolymer by condensation polymerizing the acetylated second monomer, a third monomer having an acetylamino group and not including a hydroxyl group and an amino group, and an aromatic dicarboxylic acid.

In the acetylating of the first monomer and the acetylating of the second monomer, an acetyl group (—COCH$_3$) is introduced into the hydroxyl group (—OH) of each of the first and second monomers, thereby producing an acetyloxy group (—OCOCH$_3$) and gaseous acetic acid. In this regard, the gaseous acetic acid may be easily removed from the reaction product.

In embodiments of the present invention, a wholly aromatic liquid crystalline polyester amide resin having excellent mechanical strength such as flexural properties, a compound thereof, and a molded product thereof may be prepared using the first or third monomer having an acetylamino group.

In the acetylating of the first monomer or the acetylating of the second monomer, the amount of the carboxylic acid anhydride may be in the range of 1.0 to 4.0 parts by mole based on 1 part by mole of a total of the hydroxyl group of the used monomer. In each acetylating process, when the amount of the carboxylic acid anhydride used is within this range, the acetylating of the used monomer (i.e., the first monomer and/or the second monomer) is sufficiently performed not to cause reddening of the synthesized resin and a compound thereof, and less amount of the carboxylic acid anhydride remains unreacted, thus being easily removable.

The acetylating of the first monomer and the acetylating of the second monomer may be performed at a temperature of about 140° C. to about 160° C. for about 1 to 3 hours. When the acetylation temperature and time are within these ranges, the hydroxyl groups of the first and second monomers are sufficiently converted to acetyl groups to allow subsequent condensation polymerization at low temperatures. As a result, the properties of the synthesized wholly aromatic liquid crystalline polyester amide prepolymer are not deteriorated and thus the prepolymer is not reddened.

The first monomer may include at least one compound selected from the group consisting of para-acetylaminophenol, 3-acetylaminophenol, 2-acetylaminophenol, 3-acetylamino-2-naphthol, 5-acetylamino-1-naphthol, and 8-acetylamino-2-naphthol.

The second monomer may include at least one compound selected from aromatic diols and aromatic hydroxy carboxylic acids.

The aromatic diol may include at least one compound selected from 4,4'-biphenol and hydroquinone.

The aromatic hydroxycarboxylic acid may include at least one compound selected from para-hydroxy benzoic acid and 6-hydroxy-2-naphthoic acid.

The third monomer may include at least one compound selected from the group consisting of 4-acetylamino benzoic acid, 3-acetylamino benzoic acid, 2-acetylamino benzoic acid, 3-acetylamino-2-naphthoic acid, and 6-acetylamino-2-naphthoic acid.

The carboxylic acid anhydride may include at least one compound selected from the group consisting of acetic anhydride, diphenyl carbonate, and benzyl acetate.

Each synthesizing process of the wholly aromatic liquid crystalline polyester amide prepolymer may be performed by solution condensation polymerization or bulk condensation polymerization.

The aromatic dicarboxylic acid may include at least one compound selected from the group consisting of isophthalic acid, terephthalic acid, 1,4-naphthalene dicarboxylic acid, 2,3-naphthalene dicarboxylic acid, and 2,6-naphthalene dicarboxylic acid.

In addition, in each synthesizing process of the wholly aromatic liquid crystalline polyester amide prepolymer, a metal acetate may be further used as a catalyst for facilitating the reaction. The metal acetate catalyst may include at least one compound selected from the group consisting of magnesium acetate, potassium acetate, calcium acetate, zinc acetate, manganese acetate, lead acetate, antimony acetate, and cobalt acetate. The amount of the metal acetate catalyst may be, for example, 0.10 parts by weight or less based on 100 parts by weight of a total amount of the used monomers.

Each synthesizing process of the wholly aromatic liquid crystalline polyester amide prepolymer may be performed at a temperature of about 310° C. to about 340° C. for about 5 to about 8 hours. When the synthesis temperature and time are within these ranges, a processing hindrance to discharging of byproducts after the condensation polymerization reaction does not occur, and a wholly aromatic liquid crystalline polyester amide prepolymer having physical properties suitable for a solid-phase condensation polymerization reaction may be obtained.

Each method of preparing a wholly aromatic liquid crystalline polyester amide resin may further include solid-phase condensation polymerizing each wholly aromatic liquid crystalline polyester amide prepolymer to synthesize the wholly aromatic liquid crystalline polyester amide resin. For the solid-phase condensation polymerization reaction, the wholly aromatic liquid crystalline polyester amide prepolymer needs to be appropriately heated, for example, using a heating plate, hot air, high-temperature fluid, or the like. Gases generated during the solid-phase condensation polymerization reaction may be removed by purging with an inert gas or by evacuation.

In the methods of preparing a wholly aromatic liquid crystalline polyester amide resin, the monomers including an acetylamino group and not including an amino group are used and thus all the problems such as production of gaseous byproducts generated when amino group-containing monomers are used; clogging of a column for exhausting a gas due to the production of the gases; reduction in physical properties of the synthesized wholly aromatic liquid crystalline polyester amide resin and a compound thereof; reddening of the synthesized wholly aromatic liquid crystalline polyester amide resin and a compound thereof; hindrance to the condensation polymerization reaction; a decrease in the molecular weight of the synthesized wholly aromatic liquid crystalline polyester amide resin; and blistering of the molded products may be addressed.

According to another embodiment of the present invention, there is provided a method of preparing a wholly aromatic liquid crystalline polyester amide resin compound by using a wholly aromatic liquid crystalline polyester amide resin that is prepared using the method of preparing a wholly aromatic liquid crystalline polyester amide resin.

The method of preparing a wholly aromatic liquid crystalline polyester amide resin compound includes synthesizing a wholly aromatic liquid crystalline polyester amide resin by using the each method of preparing a wholly aromatic liquid crystalline polyester amide resin; and melt-kneading each of the synthesized wholly aromatic liquid crystalline polyester amide resins and an additive. The melt-kneading process may be performed using a batch type kneader, a twin-screw extruder, a mixing roll, or the like. To smoothly perform the melt-kneading, a lubricant may be used during the melt-kneading.

The additive may include at least one selected from the group consisting of inorganic additives and organic additives.

Examples of the inorganic additives include glass fiber, talc, calcium carbonate, mica, and mixtures of at least two thereof. The organic additive may be carbon fiber.

One or more embodiments of the present invention will now be described in more detail with reference to the following examples. However, these examples are not intended to limit the scope of the one or more embodiments of the present invention.

EXAMPLES

Example 1

Preparation of Wholly Aromatic Liquid Crystalline Polyester Amide Resin (1) and Compound (1) Thereof To a 10-L reactor equipped with a stirrer, a nitrogen gas inlet, a thermometer, and a reflux condenser were added 2,486 g (18.0 mole) of para-hydroxy benzoic acid, 282 g (1.5 mole) of 6-hydroxy-2-naphthoic acid, 698 g (3.8 mole) of 4,4'-biphenol, 872 g (5.3 mole) of terephthalic acid, and 227 g (1.5 mole) of para-acetylaminophenol, and a nitrogen gas was introduced into the reactor to create an inert atmosphere. Subsequently, 0.3 g of calcium acetate was further added into the reactor together with 3,084 g (30.2 mole) of acetic anhydride to facilitate an acetylation reaction and a subsequent condensation polymerization reaction. Thereafter, the temperature of the reactor was raised to about 150° C. over 30 minutes, followed by a reflux at the same temperature for about 3 hour. Then, while removing the acetic acid byproduct, the temperature was raised to 330° C. over about 6 hours to allow a condensation polymerization reaction of the monomers, thereby preparing a wholly aromatic liquid crystalline polyester amide prepolymer. Next, the wholly aromatic liquid crystalline polyester amide prepolymer was recovered from the reactor and cooled to solidify. Subsequently, the wholly aromatic liquid crystalline polyester amide prepolymer was pulverized to an average particle diameter of 1 mm using a pulverizer. Thereafter, 3,000 g of the wholly aromatic liquid crystalline polyester amide prepolymer having a uniform particle size was put into a 10-L rotary kiln reactor, and, while continuously flowing a nitrogen gas into the reactor at about 1 Nm$^3$/hr, the temperature was raised to 200° C. at which the weight loss is initiated, over 1 hour. The temperature was then raised up to 290° C. over 5 hours and maintained for 2 hours, thereby preparing a wholly aromatic liquid crystalline polyester amide resin (1). Subsequently, the reactor was cooled to room temperature (25° C.) over 1 hour and the wholly aromatic liquid crystalline polyester amide resin (1) was then recovered from the reactor.

Next, the prepared wholly aromatic liquid crystalline polyester amide resin (1), glass fiber (ground glass fiber having a diameter of 10 μm and an average length of 150 μm), and talc (having a diameter of 2 μm to 15 μm) were mixed in a weight ratio of 65:10:25, and further melt-kneaded using a twin-screw extruder (L/D: 40, diameter: 20 mm), thereby preparing a wholly aromatic liquid crystalline polyester amide resin compound (1). In the preparation of the wholly aromatic liquid crystalline polyester amide resin compound (1), the twin-screw extruder was evacuated to remove gaseous byproducts.

Example 2

Preparation of Wholly Aromatic Liquid Crystalline Polyester Amide Resin (2) and Compound (2) Thereof A wholly aromatic liquid crystalline polyester amide resin (2) and a compound (2) thereof were prepared in the same manner as in Example 1, except that 2,707 g (19.6 mole) of para-hydroxy benzoic acid, 284 g (1.5 mole) of 6-hydroxy-2-naphthoic acid, 702 g (3.8 mole) of 4,4'-biphenol, 626 g (3.8 mole) of terephthalic acid, and 270 g (1.5 mole) of 4-acetylamino benzoic acid were used as monomers, and the amount of the acetic anhydride was changed to 3,042 g (29.8 mole).

Comparative Example 1

Preparation of Wholly Aromatic Liquid Crystalline Polyester Amide Resin (3) and Compound (3) Thereof (First Acetylation Reaction)

164 g (1.5 mole) of 4-aminophenol was put into a 10-L reactor equipped with a stirrer, a nitrogen gas inlet, a thermometer, and a reflux condenser, and a nitrogen gas was introduced into the reactor to create an inert atmosphere. Then, 0.3 g of calcium acetate was further added into the reactor along with 320 g (3.13 mole) of acetic anhydride to facilitate an acetylation reaction and a subsequent condensation polymerization reaction. Subsequently, the temperature of the reactor was raised to about 150° C. over 30 minutes, followed by a reflux at the same temperature for about 1 hour.

(Second Acetylation Reaction)

Subsequently, 2,486 g (18.0 moles) of para-hydroxy benzoic acid, 282 g (1.5 moles) of 6-hydroxy-2-naphthoic acid, 698 g (3.8 moles) of 4,4'-biphenol, and 872 g (5.3 moles) of terephthalic acid were further added to the reactor, followed by an addition of 2,859 g (28.0 moles) of acetic anhydride. Thereafter, the temperature of the reactor was raised to about 150° C. over 30 minutes, followed by a reflux at the same temperature for about 3 hours.

(Prepolymer and Resin Synthesis Reactions and Resin Compound Preparation)

Then, while removing the acetic acid gaseous byproduct, the temperature was raised to 330° C. over 6 hours to allow a condensation polymerization reaction of the monomers, thereby preparing a wholly aromatic liquid crystalline polyester amide prepolymer. The wholly aromatic liquid crystalline polyester amide prepolymer was recovered from the reactor and cooled to solidify. Thereafter, the wholly aromatic liquid crystalline polyester amide prepolymer was pulverized to an average particle diameter of 1 mm using a pulverizer. After 3,000 g of the wholly aromatic liquid crystalline polyester amide prepolymer having a uniform particle size was put into a 10-L rotary kiln reactor, while continuously flowing a nitrogen gas into the reactor at about 1 Nm$^3$/hr, the temperature was raised to 200° C. at which the weight loss is initiated, over 1 hour, then up to 290° C. over 5 hours, and maintained for 2 hours, thereby preparing a wholly aromatic liquid crystalline polyester amide resin (3). Subsequently, the reactor was cooled to room temperature (25° C.) over 1 hour and the wholly aromatic liquid crystalline polyester amide resin (3) was recovered from the reactor.

Next, the prepared wholly aromatic liquid crystalline polyester amide resin (3), glass fiber (ground glass fiber having a diameter of 10 μm and an average length of 150 μm), and talc (having a diameter of 2 μm to 15 μm) were mixed in a weight ratio of 65:10:25, and further melt-kneaded using a twin-screw extruder (L/D: 40, diameter: 20 mm), thereby preparing a wholly aromatic liquid crystalline polyester amide resin compound (3). In the preparation of the wholly aromatic liquid crystalline polyester amide resin compound (3), the twin-screw extruder was evacuated to remove gaseous byproducts.

Comparative Example 2

Preparation of Wholly Aromatic Liquid Crystalline Polyester Amide Resin (4) and Compound (4) Thereof A wholly aromatic liquid crystalline polyester amide resin (4) and a compound (4) thereof were prepared in the same manner as in Example 1, except that in the second acetylation reaction of Comparative Example 1, the amount of acetic anhydride was changed to 3,257 g (31.9 mole).

Evaluation Example

An acetylation degree of amino groups included in the monomers used in each of Examples 1 and 2 and Comparative Examples 1 and 2; and a melt viscosity, a melting temperature and a color of each of the wholly aromatic liquid crystalline polyester amide resins prepared according to Examples 1 and 2 and Comparative Examples 1 and 2 were measured and the results are shown in Table 1 below. In addition, a melt viscosity of each of the wholly aromatic liquid crystalline polyester amide resin compounds prepared according to Examples 1 and 2 and Comparative Examples 1 and 2; and tensile strength, flexural strength, impact strength, heat-resistance temperature, whether blistering occurred, and a color were measured or evaluated for each molded product of the wholly aromatic liquid crystalline polyester amide resin compounds and the results are shown in Table 2 below.

(1) Measurement of Acetylation Degree of Used Monomers

A sample was collected at time when the acetylation reaction was terminated and unacetylated monomers containing an amino group were analyzed using HPLC (manufactured by Agilant, 1100 series), thereby obtaining an acetylation degree thereof.

(2) Color Measurement Method

The wholly aromatic liquid crystalline polyester amide resins and the compounds thereof that were prepared as a flat plate having a size of 600 mm×600 mm were evaluated using a colorimeter (manufactured by Konica Minolta, CM-3700D), and "L" (brightness), "a" (red color), and "b" (yellow color) values were obtained according to Hunter's color difference formula defined in JIS Z8730. Reddening phenomenon is highly relevant to the "L" and "a" values and as the "L" value increases and the "a" value becomes close to zero, the occurrence of the reddening decreases.

(3) Melt Viscosity Measurement Method

A viscosity was measured using a melt viscosity measuring device (RH2000, available from Rosand Inc.) having a 1.0 mm×32 mm capillary at a temperature, melting temperature +10° C. and a shear rate of about 1,000/s, which was called "melt viscosity."

(4) Melting Temperature Measurement Method

A melting temperature was measured using a differential scanning calorimeter (TA Instruments Inc., DSC 2910). A temperature at which an endothermic peak was observed while a resin sample was heated from 40° C. at a rate of 20° C./min was determined as a first melting point (Tm1). While the resin sample was maintained at a temperature 30° C. higher than Tm1 for 10 minutes, cooled to 40° C. at a rate of 10° C./min, and heated at a rate of 20° C./min, a temperature at which the endothermic peak was observed was determined as a melting temperature.

(5) Measurement Methods of Tensile Strength, Flexural Strength, Impact Strength, and Heat-Resistance Temperature A sample of each of the prepared wholly aromatic liquid crystalline polyester amide resin compounds was prepared using an extruder (S-2000i 50B, available from FANUC Co. Ltd), and each sample was cooled to room temperature (25° C.) and then left for about 5 hours. Then, a tensile strength (ASTM D638), flexural strength (ASTM D790), impact strength (ASTM D256), and heat-resistance temperature (ASTM D648) of each sample were measured.

(6) Method of Evaluating the Occurrence of a Blister

A bent sample (i.e., molded product) of each of the prepared wholly aromatic liquid crystalline polyester amide resin compounds was prepared using an extruder (S-2000i 50B, available from FANUC Co. Ltd.). Each sample was heat-treated at 270° C. for 5 minutes, and it was then evaluated whether a blister occurred on the surface of each heat-treated sample by using a reflow tester (Samsung Techwin, RF30102).

TABLE 1

| | Acetylation degree of amino group (%) | Physical properties of resin | | Color of resin | | |
| --- | --- | --- | --- | --- | --- | --- |
| | | Melt viscosity (poise) | Melting temperature (° C.) | L | a | b |
| Example 1 | — | 450 | 334 | 80.9 | 1.4 | 22.1 |
| Example 2 | — | 630 | 336 | 81.3 | 0.9 | 21.8 |
| Comparative Example 1 | 97 | 500 | 335 | 78.2 | 1.8 | 19.1 |
| Comparative Example 2 | 89 | 1,200 | 335 | 74.0 | 2.4 | 15.8 |

Referring to Table 1 above, the monomers used in Examples 1 and 2 do not contain amino groups and thus problems due to the amino groups do not occur. On the other hand, in the case of the monomers used in Comparative Examples 1 and 2, an acetylation degree of amino groups that is measured after an acetylation reaction is measured to be less than 100% and thus it is easily predictable that all the problems caused by amino groups that remain when a wholly aromatic liquid crystalline polyester amide resin and a compound thereof are prepared occur, i.e., reduction in physical properties of the prepared wholly aromatic liquid crystalline polyester amide resin and the compound thereof. As anticipated above, each of the wholly aromatic liquid crystalline polyester amide resins of Comparative Examples 1 and 2 had high melt viscosity and melting temperature and a higher degree of reddening occurrence than those of each of the wholly aromatic liquid crystalline polyester amide resins of Examples 1 and 2, which exhibits deterioration of all the physical properties.

TABLE 2

| | Melt viscosity of resin compound | Color of resin compound | | | Physical properties of molded product | | | | |
|---|---|---|---|---|---|---|---|---|---|
| | | | | | Tensile strength | Flexural strength | Impact strength | Heat-Resistance temperature | Occurrence of blisters (yes: ○, |
| | (poise) | L | a | b | (MPa) | (MPa) | (J/m) | (° C.) | no: X) |
| Example 1 | 327 | 87.5 | −0.2 | 10.5 | 121 | 155 | 886 | 266 | X |
| Example 2 | 494 | 88.3 | −0.2 | 9.9 | 128 | 161 | 920 | 269 | X |
| Comparative Example 1 | 350 | 85.6 | −0.1 | 9.2 | 116 | 152 | 860 | 265 | X |
| Comparative Example 2 | 779 | 83.4 | 0.1 | 9.4 | 117 | 146 | 610 | 262 | ○ |

Referring to Table 2 above, each of the wholly aromatic liquid crystalline polyester amide resin compounds of Examples 1 and 2 has lower melt viscosity and a lower degree of reddening occurrence than each of the wholly aromatic liquid crystalline polyester amide resin compounds of Comparative Examples 1 and 2, exhibiting excellent physical properties. In addition, the molded products of the wholly aromatic liquid crystalline polyester amide resin compounds of Examples 1 and 2 exhibit excellent physical properties as compared to the molded products of the wholly aromatic liquid crystalline polyester amide resin compounds of Comparative Examples 1 and 2.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing a wholly aromatic liquid crystalline polyester amide resin, the method comprising:
   acetylating a first monomer having both a hydroxyl group and an acetylamino group and not having an amino group by reacting the first monomer with carboxylic acid anhydride; and
   synthesizing a wholly aromatic liquid crystalline polyester amide prepolymer by a condensation polymerization reaction of the acetylated first monomer and aromatic dicarboxylic acid.

2. The method of claim 1, further comprising acetylating a second monomer having a hydroxyl group and not having an amino group and an acetylamino group by reacting the second monomer with carboxylic acid anhydride.

3. The method of claim 1, wherein the first monomer comprises at least one compound selected from the group consisting of para-acetylaminophenol, 3-acetylaminophenol, 2-acetylaminophenol, 3-acetylamino-2-naphthol, 5-acetylamino-1-naphthol, and 8-acetylamino-2-naphthol.

4. A method of preparing a wholly aromatic liquid crystalline polyester amide resin, the method comprising:
   acetylating a second monomer having a hydroxyl group and not having an amino group and an acetylamino group by reacting the second monomer with carboxylic acid anhydride; and
   synthesizing a wholly aromatic liquid crystalline polyester amide resin prepolymer by a condensation polymerization reaction of the acetylated second monomer, a third monomer having an acetylamino group and not having a hydroxyl group and an amino group, and aromatic dicarboxylic acid.

5. The method of claim 1, further comprising synthesizing a wholly aromatic liquid crystalline polyester amide resin by a solid-phase condensation polymerization reaction of the synthesized wholly aromatic liquid crystalline polyester amide resin prepolymer.

6. The method of claim 1, wherein an amount of the carboxylic acid anhydride is in a range of 1.0 to 4.0 moles by weight based on 1 mole of a total amount of the hydroxyl groups of the used monomers.

7. The method of claim 4, wherein the second monomer comprises at least one compound selected from the group consisting of aromatic diols and aromatic hydroxycarboxylic acids.

8. The method of claim 7, wherein the aromatic diol comprises at least one compound selected from the group consisting of 4,4'-biphenol, hydroquinone, 1,4-dihydroxy naphthalene, and 2,6-dihydroxy naphthalene, and the aromatic hydroxycarboxylic acid comprises at least one compound selected from para-hydroxy benzoic acid and 6-hydroxy-2-naphthoic acid.

9. The method of claim 5, wherein the third monomer comprises at least one selected from the group consisting of 4-acetylamino benzoic acid, 3-acetylamino benzoic acid, 2-acetylamino benzoic acid, 3-acetylamino-2-naphthoic acid, and 6-acetylamino-2-naphthoic acid.

10. The method of claim 1, wherein the carboxylic acid anhydride comprises at least one compound selected from the group consisting of acetic anhydride, diphenyl carbonate, and benzyl acetate.

11. The method of claim 1, wherein the aromatic dicarboxylic acid comprises at least one compound selected from the group consisting of isophthalic acid, naphthalene dicarboxylic acid, terephthalic acid, 1,3-propane dicarboxylic acid, 1,4-butane dicarboxylic acid, and 1,5-pentane dicarboxylic acid.

12. The method of claim 1, wherein the acetylating of the first monomer or the acetylating of the second monomer is performed at a temperature of 140 to 160° C. for 1 to 3 hours.

13. The method claim 1, wherein the synthesizing of the wholly aromatic liquid crystalline polyester amide prepolymer is performed at a temperature of 310 to 340° C. for 5 to 8 hours.

14. A method of preparing a wholly aromatic liquid crystalline polyester amide resin compound by using a wholly aromatic liquid crystalline polyester amide resin that is prepared using the method according to claim 1.

15. The method of claim 4, further comprising synthesizing a wholly aromatic liquid crystalline polyester amide resin by a solid-phase condensation polymerization reaction of the synthesized wholly aromatic liquid crystalline polyester amide resin prepolymer.

16. The method of claim 15, wherein the third monomer comprises at least one selected from the group consisting of 4-acetylamino benzoic acid, 3-acetylamino benzoic acid, 2-acetylamino benzoic acid, 3-acetylamino-2-naphthoic acid, and 6-acetylamino-2-naphthoic acid.

17. The method of claim 4, wherein an amount of the carboxylic acid anhydride is in a range of 1.0 to 4.0 moles by weight based on 1 mole of a total amount of the hydroxyl groups of the used monomers.

18. The method of claim 4, wherein the carboxylic acid anhydride comprises at least one compound selected from the group consisting of acetic anhydride, diphenyl carbonate, and benzyl acetate.

19. The method of claim 4, wherein the aromatic dicarboxylic acid comprises at least one compound selected from the group consisting of isophthalic acid, naphthalene dicarboxylic acid, terephthalic acid, 1,3-propane dicarboxylic acid, 1,4-butane dicarboxylic acid, and 1,5-pentane dicarboxylic acid.

20. The method of claim 2, wherein the acetylating of the first monomer or the acetylating of the second monomer is performed at a temperature of 140 to 160° C. for 1 to 3 hours.

21. The method of claim 4, wherein the acetylating of the first monomer or the acetylating of the second monomer is performed at a temperature of 140 to 160° C. for 1 to 3 hours.

22. The method of claim 4, wherein the synthesizing of the wholly aromatic liquid crystalline polyester amide prepolymer is performed at a temperature of 310 to 340° C. for 5 to 8 hours.

\* \* \* \* \*